United States Patent

[11] 3,584,716

| [72] | Inventor | Donald J. Coty<br>Kettering, Ohio |
|---|---|---|
| [21] | Appl. No. | 846,147 |
| [22] | Filed | July 30, 1969 |
| [45] | Patented | June 15, 1971 |
| [73] | Assignee | General Motors<br>Detroit, Mich. |

[54] VISCOUS FLUID CLUTCH
7 Claims, 7 Drawing Figs.

[52] U.S. Cl. ................................................. 192/58, B
192/82(T)
[51] Int. Cl. ...................................................... F16d 35/00
[50] Field of Search ............................................. 192/58
A1,A2,A3, 82 TO

[56] References Cited
UNITED STATES PATENTS

| 3,055,473 | 9/1962 | Oldberg et al. | 192/82(TO)(X) |
| 3,259,221 | 7/1966 | Godfrey | 192/58(A1) |
| 3,463,282 | 8/1969 | Fujita et al. | 192/58(A2) |

*Primary Examiner*—Allan D. Herrmann
*Attorneys*—Warren E. Finken, A. M. Heiter and John P. Moran ABSTRACT: A viscous fluid clutch including relatively rotatable first and second drive members having a fluid shear space therebetween and which are cooperable with a fluid medium in the shear space to provide a shear-type fluid drive therebetween, an annular reservoir for at times storing the fluid medium, a temperature-responsive valve for controlling the flow of the fluid medium from the annular reservoir through an inlet port to the fluid shear space, continually open outlet ports and cooperating pump elements or wipers for forcing the fluid medium from the fluid shear space to the reservoir, and closed-ended radial slots formed on one of the drive members radially outwardly of openings formed therethrough for causing the fluid medium flowing from the annular reservoir to fill the shear space and drive the driven member at its maximum speed at a predetermined temperature, despite variations in the viscosity of the fluid medium.

PATENTED JUN 15 1971

3,584,716

INVENTOR
Donald J. Coty
BY
John P. Moran
ATTORNEY

VISCOUS FLUID CLUTCH

This invention relates generally to variable speed drive devices, and more particularly, to a viscous fluid drive adapted to drive an accessory device, such as a cooling fan, for an internal combustion engine.

Vehicle-cooling fans are generally belt driven from the engine crankshaft, and are operable at a fixed speed ratio with respect to the vehicle engine. It has been found desirable to vary the speed ratio of the fan with respect to the engine speed so that at low engine speed the fan will be running at a relatively high speed for maximum cooling and as the speed of the engine increases, such as when the vehicle is running in direct drive at road speeds, the ram air-cooling effect on the engine is increased and the necessity for fan cooling is diminished. The resultant lower fan speed eliminates excessive fan noise which otherwise could be disturbing to the occupants of the vehicle.

The device disclosed herein relates to an engine cooling fan mechanism wherein a viscous fluid, shear-type clutch is utilized to transmit power from the vehicle engine to the fan blade assembly.

An object of the invention is to provide improved means for ensuring that maximum fan speed will be attained at a predetermined ambient temperature when using fluid mediums having viscosities of up to 9,000 centistokes and beyond. Another object of the invention is to provide improved means associated with the clutch plate for ensuring proper fluid flow through the shear space to effect a satisfactory viscous drive while maintaining the desired fan speed/ambient temperature relationship.

A more specific object of the invention is to provide a viscous shear fan drive having a housing including a finned rear wall, a front wall, a divider wall therebetween, an operating or working chamber formed between the rear and divider walls for receiving a clutch plate in viscous shear relation with the housing, an annular reservoir formed between the divider and front walls, continuously open outlet ports formed in the divider wall and cooperating pump or dam means for forcing the fluid from the reservoir and through the outlets into the operating chamber, and a temperature-controlled inlet port formed in the divider wall between the operating chamber and the reservoir, and a plurality of V-grooves formed in the clutch plate for causing high-viscosity fluid flowing through the temperature-controlled inlet port to fill the working chamber at the desired ambient temperature.

These and other objects and advantages will become apparent when reference is made to the following description and the accompanying drawings wherein.

Figure 3:
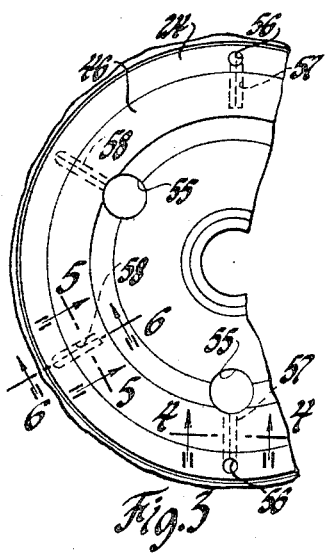
FIG. 3 is a cross-sectional view a taken on the plane of line 3-3 of FIG. 2, as if FIG. 2 were a complete and full round view, and looking in the direction of the arrows.
Figure 4:
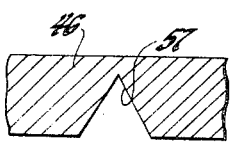
Figure 5:
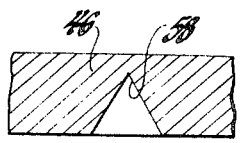
Figure 6:
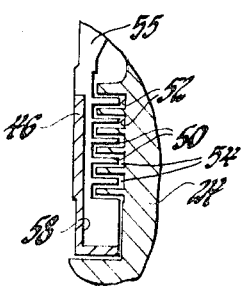
Figure 7:
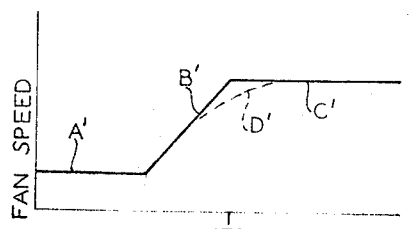

FIGS. 4, 5 and 6 are enlarged fragmentary cross-sectional views taken on the planes of lines 4-4, 5-5 and 6-6, respectively, of FIG. 3, and looking in the directions of the arrows; and FIG. 7 is a graph illustrating a characteristic of the invention.

Figure 1:
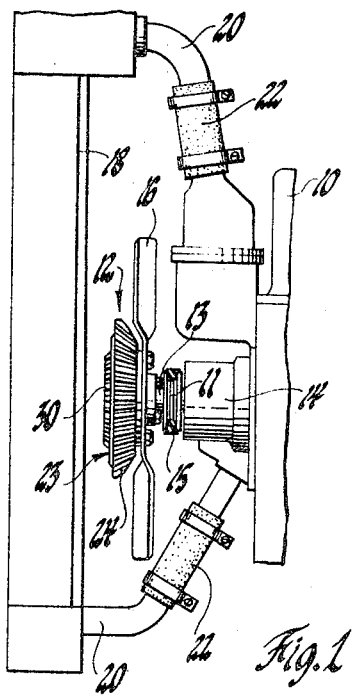
FIG. 1 is a fragmentary side elevational view of a radiator and engine having a viscous fluid clutch-driven cooling fan associated therewith.

Referring to the drawings in greater detail, FIG. 1 illustrates an engine 10 having a viscous fluid clutch 12 and a pulley 11 mounted on a drive shaft 13 extending from the conventional water pump 14, the pulley 11 being rotated by a V-belt 15 connected to the crankshaft (not shown) for driving a cooling fan 16 secured to the clutch 12. The fluid clutch 12 and the cooling fan 16 are located between the engine 10 and a radiator 18. The usual conduits 20 and associated hoses 22 communicate between radiator 18 and the engine 10 adjacent the water pump 14.

Figure 2:
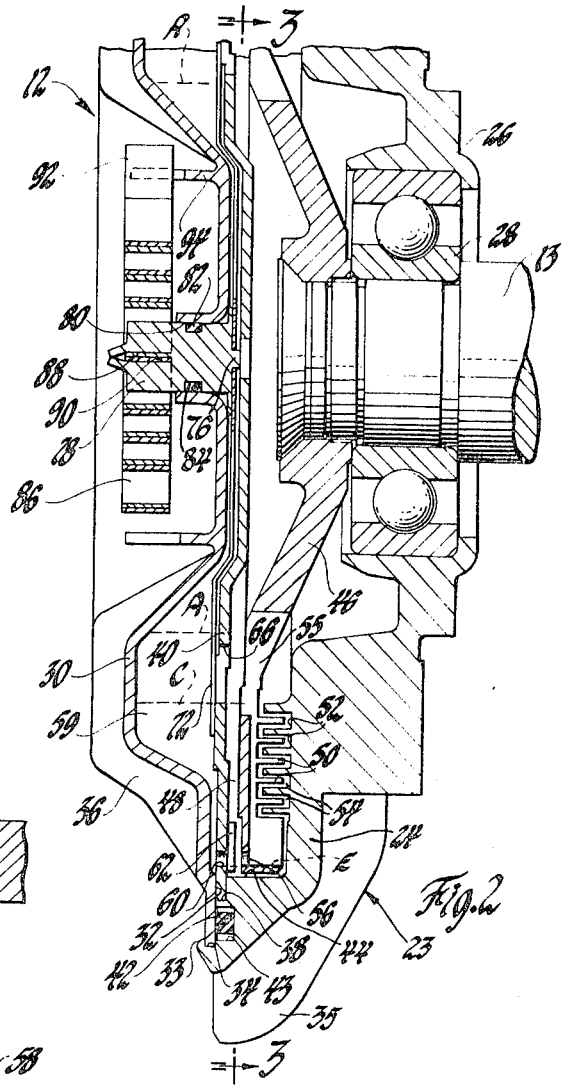
FIG. 2 is an enlarged cross-sectional view of a viscous fluid, shear-type clutch embodying the invention.

Referring now to FIG. 2, the fluid clutch 12 includes a housing 23 which includes a rear wall member 24 having a hub 26 which is rotatably mounted by a suitable bearing 28 on the drive shaft 13. The housing 23 further includes a cover member or front wall 30 which has an annular flat surface 32 formed adjacent its peripheral edge, the latter being confined by an annular lip 33 in an annular recess 34 formed in the housing 23. Cooling fins 35 and 36 are formed on the outer surfaces of the rear wall member 24 and the cover member 30, respectively. A second annular recess 38 is formed radially inward of the outer periphery of the annular recess 34. A divider wall 40 is confined adjacent its outer edge in the second annular recess 38 by the cover member 30. A seal 42 is compressed in an annular groove 43 formed in the rear wall member 24 intermediate the outer edges of the annular recesses 34 and 38. A third annular deeper recess 44 is formed in the rear wall member 24 radially inward of the second annular recess 38. A clutch plate 46 is secured at its center by any suitable means to the drive shaft 13, the outer peripheral portion thereof being freely located in an operating or working chamber 48 formed by the third annular recess 44.

Adjacent portions of the clutch plate 46 and the rear wall member 24 are provided with torque-transmitting elements consisting of cooperating annular ridge and groove elements 50 and 52, respectively, with an intervening fluid shear space 54 therebetween to accommodate a viscous fluid as a torque-transmitting medium.

Referring now to FIG. 3, it may be noted that the clutch plate 46 further includes a plurality of equispaced openings 55 formed therein at a point radially inward from the ridge and groove elements 50 and 52. A pair of oppositely disposed smaller openings 56 are formed in the clutch plate 46 adjacent the outermost edge thereof, one of which is illustrated as being radially aligned with one of the larger openings 55, but such need not be the case. A pair of radial V-shaped grooves 57 (FIGS. 3 and 4) are formed in the clutch plate 46 across the ridges 50 and terminating at the openings 56. The grooves 57 assist in the process of removing the fluid medium from the working chamber 48, as will be explained.

A plurality of recesses or radial, V-shaped grooves 58 (FIGS. 3 and 5) are formed in the clutch plate 46 across the ridges 50 and, when considered with the V-grooves 57, are equally spaced thereon. As illustrated in FIGS. 3 and 6, the V-grooves 58 are blind or closed at their outermost ends, forming a dam at those points, and serving as an improved means for properly refilling the working chamber 48 and bringing the fully "engaged mode" into operation at the desired ambient temperature, as will be explained. If desired, the grooves 58 may be formed across the grooves 52 of the rear wall member 24, and/or may vary in the number. The V-grooves 57 and 58 may have substantially the same width and depth, or may comprise various dimensions and/or shapes other than "V'S."

It may be noted in FIG. 2 that the front wall or cover member 30 includes an annular bend intermediate the centers and peripheral edges thereof which forms an annular reservoir 59 with the divider wall 40. One or more pump outlet openings 60 are formed through the divider wall 40 circumferentially adjacent pump or dam elements 62 formed on the divider wall 40, and at substantially the same radial distance from the center of the clutch 12 as the outer clutch plate openings 56. The pump outlet openings 60 communicate between the operating chamber 48 and the annular reservoir 59 and are substantially the same diameter as the clutch plate openings 56. The pump elements 62 may consist of a circular boss formed on the divider wall 40 by any suitable means, such as stamping, or it may be a rectangular-shaped or other-shaped member secured to the divider wall 40, such as by welding. It is to be understood that, in some applications, one outlet and one pump element may be sufficient, while other applications may require two such pumping arrangements. In the latter instance, one of the outlet openings 60 may be at times closed by an internal bimetallic thermostatic valve (not shown).

One or more inlet ports 66 are also formed in the divider wall 40, communicating between the annular reservoir 59 and the working chamber 48 radially inward of the pump elements 62 and the pump outlet openings 60. The inlet port 66 is at times closed off by a valve member 72. The valve member 72 is secured in any suitable manner to a reduced diameter portion 76 of a center pin or shaft 78, which is rotatably mounted in a central opening 80 formed in the front wall or cover member 30. A seal ring 82 may be mounted in an annular groove 84 formed in the pin 78 within the central opening 80 to prevent leakage therepast. A helically wound, bimetallic thermostatic valve control element 86 is provided with an inwardly extending end portion 88 which is mounted in a transverse slot 90 formed in the pin 78. An outwardly extending end portion 92 of the bimetallic element 86 is secured to a post 94. With this arrangement, a change in ambient temperature either winds or unwind the bimetallic element 86, resulting in rotation of the pin 78 and the valve member 72.

OPERATION

So long as the vehicle engine 10 (FIG. 1) is in operation, the drive shaft 13 and the associated clutch plate 46 (FIG. 2) will be driven by the pulley 11 operatively connected via the bit 15 to the crankshaft (not shown) at an appropriate speed ration with respect to engine speed. The initial position of the temperature-responsive valve member 72 will be closed across the inlet opening 66 in the divider wall 40, and will remain closed so long as the engine is cold, thus preventing any flow of fluid from the annular reservoir 59 into the working chamber 48. Since at least one pump outlet opening 60 is always open, providing continuous communication between the working chamber 48 and the annular reservoir 59, fluid from the working chamber 48 will be pumped therethrough by virtue of the pump elements 62 serving as dams or wipers, forcing the fluid to flow into the respective pump outlet openings 60 and, thence, into the annular reservoir 59. A continual supply of fluid is made available to the wiper elements 62 by virtue of the openings 56 formed in the clutch plate 46. The openings 56 are fed by fluid from the radial V-grooves 57 under the action of centrifugal force and the effect of suction created by the pumping action of the elements 62 and the outlets 60.

It is believed that, while the closed-ended radial grooves 58 do not feed fluid to ports or openings, such as the openings 56, they may serve as compartments in which the fluid is cooled and from which fluid is more readily available to the annular grooves 52 during the working chamber 48 emptying process.

The total volume of fluid is such that when the working chamber 48 is substantially empty, i.e., at a level designated by broken line E, FIG. 2, at the outermost edge of the openings 56, the fluid in the annular reservoir 59 will be held under the action of centrifugal force in the outer annular portion of the reservoir 59 with an inner annular liquid level A, FIG. 2, the head resulting from the fluid height A to E being offset by the force generated by the pumping action of the pump elements 62 on the fluid remaining in the working chamber 48, to prevent any flowback through the outlet openings 60. Under this condition, commonly known as the "disengaged mode", the slip between the clutch plate 46 and the housing 23 is greatest, and fan speed is correspondingly low, as represented by the curve A in FIG. 7.

As the ambient temperature increases due to the warmup of the radiator and engine, the bimetallic thermostatic valve control element 86 will begin to wind up and, since it is restrained at its outer end 92 by the post 94, its inner end 88 will rotate the cooperatively connected pin 78 and the valve member 72, progressively uncovering the inlet ports 66, as will be described. As a result, fluid will flow through the inlet ports 66 back into the working chamber 48, generally progressively increasing the volume therein with increasing temperature. More specifically, as the fluid is admitted through the inlet ports 66 by the temperature-controlled valve element 72, it will first be projected radially outwardly between the divider 40 and the adjacent face of the clutch plate 46. It is believed to begin to fill the peripheral shear space between the outer edge of the clutch plate 46 and the wall of the annular recess 44, while filling radially inwardly between the wall 40 and the adjacent face of the plate 46. Once the fluid attains a level radially within the outer edge of the openings 55 formed in the clutch plate 46, it will spill through the openings 55 into the shear space 54.

At this point, high-viscosity fluids, say, from 5,000 to 9,000 centistokes or more, have been known to require an additional length of time to fill the shear space 54 and arrive at a fully engaged mode, as compared to lower viscosity fluids. If the grooves 58 were not present, the high-viscosity fluid would slowly follow an alternating stepped path while progressing radially outwardly under the action of centrifugal force, through the stepped shear space 54. That portion of fluid which would flow more rapidly through the straight path formed by the V-grooves 57 at this time would continue through the openings 56 and thence through the outlet ports 60 as a result of the suction effect of the pumping action of the elements 62 and the outlets 60, to be recirculated through the system. The V-grooves 57 are, accordingly, not believed to aid materially in the working chamber 48 filling process. The result is that the maximum fan speed curve c', FIG. 7, is not reached at the desired ambient temperature, say, 170° F., since the curve B' is unable to be followed. Instead, a curve on the order of D' is effected and the resultant fan speed is seen to be lower than it should be over a relatively high temperature range.

Now, with the formation of the V-grooves 58 on the clutch plate 46 or on the rear wall member 24, higher viscosity fluid, as well as lower viscosity fluid, is, under centrifugal force, able to be linearly and, therefore, more directly communicated to the radially outer closed ends thereof, which serve as dams for directing the fluid into the annular grooves 52 which form the shear space 54, causing same to be filling in accordance with the desired fan speed-temperature curve B'.

Throughout the above, the volume of flow through the continually open outlet ports 60 remains substantially constant, being influenced by the rotary speed of the clutch plate 46, and the working chamber 48 is filled in the manner just described until the inner annular levels in both the working chamber 48 and the annular reservoir 59 are at the level designated by C, after which the fan speed will remain at its highest constant speed, as represented by the corresponding curve C' of FIG. 7. It is apparent that, as the viscous fluid is admitted to the working chamber 48 with increased temperature, filling the fluid shear space 54 between the oppositely disposed spaced ridge and groove elements 50 and 52, the shear-type fluid drive therebetween will be influenced, and "slip speed," or the difference between the speed of the clutch plate 46 and that of the housing 23, will decrease, with the fan speed progressively increasing, as indicated by curve B' in FIG. 7. So long as the inlet ports 66 remain open, a fluid circulation process will prevail, i.e., the rotating pump or dam elements 62 will continue to promote the flow of fluid from the working chamber 48 through the pump outlet openings 60 to the annular reservoir 59 from whence it will continually return to the working chamber 48 via the variably opening inlet ports 66.

As indicated, when the cooling requirements are at a maximum, the temperature-responsive valve member 72 will have rotated completely past the inlet openings 66, permitting the fluid in the chamber 48 and the reservoir 59 to reach a point of equilibrium, i.e., liquid level C in FIG. 2, causing the relatively rotatable drive members 46 and 24 to operate at minimum slip speed and thereby effecting a maximum cooling function, inasmuch as the fan 16 is secured to the outer portion of the rear wall member 24 of the housing 23 (FIG. 1). So long as inlet ports 66 remain fully open, the circulation process described above will maintain the level C illustrated in FIG. 2.

It should be apparent that the invention provides means for causing high-viscosity fluid received in the working chamber from the reservoir through one or more temperature-controlled inlet ports to flow into the viscous shear space and fill same to effect a fully engaged mode and a resultant maximum fan speed at a predetermined ambient temperature.

While but one embodiment of the invention has been shown and described, other modifications thereof are possible.

I claim:

1. A viscous fluid clutch comprising first and second relatively rotatable drive means, said first drive means having an annular operating chamber and a reservoir chamber, fluid shear drive means on said first and second drive means located in said operating chamber forming a shear space therebetween and operable with a fluid to provide a shear-type fluid drive between said first and second drive means, said operating chamber having outlet-opening means at an outer portion and inlet-opening means at an inner portion, pump means on one of said drive means to pump fluid from said operating chamber through said outlet-opening means to said reservoir chamber, and passage means formed through said second drive means and transversely across a portion of said fluid shear drive means and terminating at a point adjacent and radially inward of the outer edge of said second drive means for causing said fluid flowing from said reservoir chamber through said inlet opening means into said operating chamber to fill said shear space between said fluid shear drive means on said first and second relatively rotatable drive means at a predetermined temperature.

2. A viscous fluid clutch comprising first and second relatively rotatable drive members, said first drive member including a first wall, a second wall and a divider wall sealed between said first and second walls providing a working chamber between said divider and second walls and a second chamber between said first and divider walls, fluid shear drive means on said first and second drive members in said working chamber operable with a fluid medium having a viscosity of up to 9,000 centistokes and beyond to provide a shear-type fluid drive therebetween, first opening means in said divider wall for providing communication from said working chamber to said second chamber, pump means on one of said drive members for causing said fluid medium to flow from said working chamber through said first opening means to said second chamber, second opening means formed in said divider wall for communicating said fluid medium from said second chamber to said working chamber, and radially extending circulation means on one of said drive members and having an open inner portion and a closed outer portion for causing said fluid medium to fill said shear-type fluid drive portion of said working chamber and bring said first drive member up to maximum speed at a predetermined ambient temperature.

3. A viscous fluid clutch comprising first and second relatively rotatable drive means, said first drive means having an annular operating chamber and a reservoir chamber, a plurality of annular ridges formed on one of said first and second drive means and a plurality of cooperating annular grooves formed on the other of said first and second drive means in said operating chamber, said annular ridges and grooves forming a shear space operable with a fluid to provide a shear-type fluid drive between said first and second drive means, said operating chamber having outlet-opening means at an outer portion and inlet-opening means at an inner portion, pump means on one of said drive means to pump fluid from said operating chamber through said outlet-opening means to said reservoir chamber, opening means formed through said second drive means and dead ended groove means formed on the fluid shear drive side of said second drive means for receiving fluid from said reservoir chamber through said inlet opening means and said last-mentioned opening means and causing said fluid to flow circumferentially into said annular grooves to fill said shear space.

4. A viscous fluid clutch comprising first and second relatively rotatable drive members, said first drive member including front and rear walls and defining a fluid cavity therebetween, a divider wall sealed between said front and rear walls in said fluid cavity and dividing said fluid cavity into first and second chambers, said second drive member being rotatable in said first chamber, said second drive member and said rear wall having opposed spaced parallel surfaces defining a fluid shear space therebetween and cooperable with a fluid medium in said shear space to provide a shear-type fluid drive therebetween, a first opening formed in said divider wall for providing communication between said first chamber and said second chamber, a dam element formed on said divider wall in said first chamber adjacent said first opening for causing said fluid medium to flow through said first opening for varying the volume of fluid medium in said shear space to vary the torque transmitted between said first and second drive members, a second opening formed in said divider wall for at times communicating said fluid medium from said second chamber to said first chamber, valve means for controlling the flow of said fluid medium through said second opening to further vary the torque transmitted between said first and second drive members, at least one radial groove formed on said second drive member transverse said spaced parallel surfaces, said at least one radial groove having a closed outer end and an open inner end, and a plurality of openings formed in said second drive member and located on a circle radially inward of said at least one radial groove.

5. The viscous fluid clutch described in claim 4, and bimetallic thermostat means for actuating said valve means.

6. A viscous clutch comprising first and second relatively rotatable drive members, said first drive member including a first wall, a second wall and a divider wall sealed between said first and second walls providing a working chamber between said divider and second walls and a second chamber between said first and divider walls, fluid shear drive means on said first and second drive members in said working chamber operable with a fluid medium to provide a shear-type fluid drive therebetween, first opening means in said divider wall for providing communication from said working chamber to said second chamber, pump means on one of said drive members in cooperation with said rotating second drive member for causing said fluid medium to flow from said working chamber through said first opening means to said second chamber, ambient temperature-responsive opening means formed in said divider wall for communicating said fluid medium from said second chamber to said working chamber on the side of said second drive member adjacent said divider wall, a plurality of openings formed in said second drive member equidistant from the center thereof for permitting said fluid medium to spill over from said side of said second drive member adjacent said divider wall to said shear-type fluid drive side of said first drive member, and a plurality of radial grooves formed transversely through said fluid shear drive means on one of said drive members and having their inner ends adjacent the circle of radial outer edges of said equidistant openings and their outer ends closed within the outer edge of said second drive member for receiving said fluid medium spilled through said equidistant openings and filling the shear-type fluid drive space between said fluid shear drive means.

7. A viscous clutch comprising first and second relatively rotatable drive members, said first drive member including a first wall, a second wall and a divider wall sealed between said first and second walls providing a working chamber between said divider and second walls and a second chamber between said first and divider walls, fluid shear drive means on said first and second drive members in said working chamber operable with a fluid medium to provide a shear-type fluid drive therebetween, first opening means formed adjacent an outer edge of said divider wall for providing communication from said working chamber to said second chamber, second opening means formed in said second drive member on the same circle as said first opening means, a radial groove formed in said second drive member terminating at said second opening means, pump means on one of said drive members in cooperation with said second opening means and said radial groove for causing said fluid medium to flow from said working chamber through said first opening means to said second chamber, ambient temperature-responsive opening means formed in said divider wall for communicating said fluid medium from said second chamber to said working chamber on the side of said second drive member adjacent said divider wall, a plurality of openings formed in said second drive member equidistant from the center thereof for permitting said fluid medium to spill over from said side of said second drive member adjacent said divider wall to said shear-type fluid drive side of said second drive member, and a plurality of radial recesses formed transversely through said fluid shear drive means radially outwardly of said plurality of openings in said second drive member and having their outer ends closed within the outer edge of said second drive member for receiving said fluid medium spilled through said equidistant openings and filling the shear-type fluid drive space between said fluid shear drive means.